(12) United States Patent
Kiyota et al.

(10) Patent No.: US 7,005,673 B2
(45) Date of Patent: Feb. 28, 2006

(54) ITO FILM-FORMED SUBSTRATE, AND MANUFACTURING METHOD THEREOF

(75) Inventors: Shogo Kiyota, Kanagawa (JP); Yukihiro Katoh, Mie (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 44 days.

(21) Appl. No.: 10/754,249

(22) Filed: Jan. 9, 2004

(65) Prior Publication Data

US 2004/0227885 A1    Nov. 18, 2004

Related U.S. Application Data

(63) Continuation of application No. PCT/JP02/06842, filed on Jul. 5, 2002.

(30) Foreign Application Priority Data

Jul. 10, 2001    (JP) ............................. 2001-209089

(51) Int. Cl.
*H01L 35/24* (2006.01)

(52) U.S. Cl. ........................... 257/40; 438/22; 438/30; 257/72

(58) Field of Classification Search ................ 438/22; 257/40

See application file for complete search history.

(56) References Cited

U.S. PATENT DOCUMENTS 6,277,507 B1 *   8/2001   Anzaki et al. .............. 428/702

FOREIGN PATENT DOCUMENTS

| JP | 6-148618 A | 5/1994 |
|----|------------|--------|
| JP | 2000-180840 A | 6/2000 |

* cited by examiner

*Primary Examiner*—Thao P. Le
(74) *Attorney, Agent, or Firm*—Frishauf, Holtz, Goodman & Chick, P.C.

(57) ABSTRACT

An ITO film-formed substrate having excellent alkali resistance and adhesion is provided. For the ITO film-formed substrate, a structure is adopted in which a color filter 102, an organic protective film 103, intermediate layers 104a and 104b, and an ITO film 105 having an electrode pattern patterned therein are formed in this order from the bottom upwards on a surface of a glass substrate 101. The intermediate layer 104a is deposited on a surface of the organic protective film 103 through a high-frequency sputtering method using Ar as an introduced gas, and is made of a metal oxide that is not prone to dissolving in alkalis; the intermediate layer 104b is deposited through a reactive sputtering method or a high-frequency sputtering method, and is made of a metal oxide or metal nitride that is not prone to dissolving in alkalis.

18 Claims, 5 Drawing Sheets

ITO FILM-FORMED SUBSTRATE, AND MANUFACTURING METHOD THEREOF

This application is a continuation application of International Application PCT/JP02/06842 filed Jul. 5, 2002.

TECHNICAL FIELD

The present invention relates to a substrate formed with a tin-oxide-containing indium oxide (hereinafter referred to as "ITO") film, and a method of manufacturing the substrate, and in particular to an ITO film-formed substrate for use as a liquid crystal display element of a color liquid crystal display, and a method of manufacturing the substrate.

BACKGROUND ART

Conventionally, substrates formed with a tin-oxide-containing indium oxide (hereinafter referred to as "ITO") film have been used as liquid crystal display elements for use in color liquid crystal panels and the like.

With a general ITO film-formed substrate, a structure is adopted in which a color filter, an organic protective film, and an ITO film are formed in this order from the bottom upwards on a surface of a glass substrate.

The ITO film formed on the substrate surface functions as an electrode of the substrate, and the electrode pattern is usually formed using a photolithography method. In the photolithography method, it is necessary to pattern the electrode pattern into the ITO film on the substrate using a strong acid, and then strip off a resist used in the patterning using a strong alkali; chemical resistance and adhesion are thus required of the substrate, so that peeling off of the ITO film from the substrate due to the strong acid and/or the strong alkali used in these two steps can be prevented. Consequently, from hitherto, to improve the adhesion between the ITO film and the organic protective film, an $SiO_2$ film has been deposited through a high-frequency sputtering method as an intermediate layer between the ITO film and the organic protective film.

Furthermore, a substrate that uses a conventional intermediate layer comprised of an $SiO_2$ film has a problem that the chemical resistance, in particular the alkali resistance, is low, and hence as a film deposition method for resolving this problem, a method has been disclosed in which a metal nitride film of $SiN_x$ or the like is interposed between the ITO film and the organic protective film, and moreover a metal oxide film of $SiO_x$ or the like is interposed between the metal nitride film and the ITO film (Japanese Laid-Open Patent Publication (Kokai) No. 6-148618).

However, although the method disclosed in Japanese Laid-Open Patent Publication (Kokai) No. 6-148618 is certainly capable of improving the alkali resistance of the substrate, it is a valid method only for forming an $SiO_x$ film as an intermediate layer through a reactive sputtering method using Si as a target and $O_2$ as an introduced gas, and is not a valid method for forming an $SiO_2$ film through a high-frequency sputtering method as used as an intermediate layer from hitherto. In this way, with this conventional method, a high-frequency sputtering method, which is generally capable of forming a film having higher adhesion than with a reactive sputtering method, cannot be used. There has thus been a problem that the adhesion is worse than with an $SiO_2$ film conventionally used as an intermediate layer.

Moreover, regarding the alkali resistance of a substrate obtained through this conventional film deposition method, the above required properties are not sufficiently satisfied.

It is an object of the present invention to provide an ITO film-formed substrate having excellent alkali resistance and adhesion, and a manufacturing method thereof.

DISCLOSURE OF THE INVENTION

To attain the above object, an ITO film-formed substrate according to a first aspect of the present invention comprises a glass substrate, a color filter deposited on a surface of the glass substrate, an organic protective film deposited on a surface of the color filter, an intermediate layer deposited on a surface of the organic protective film, and an ITO film deposited on a surface of the intermediate layer, and is characterized in that the intermediate layer comprises a first intermediate layer that is deposited on the surface of the organic protective film through a high-frequency sputtering method using Ar as an introduced gas, and is made of a metal oxide that is not prone to dissolving in alkalis, and a second intermediate layer that is deposited on a surface of the first intermediate layer, and is made of a metal oxide or metal nitride that is not prone to dissolving in alkalis.

In the ITO film-formed substrate according to the first aspect, it is preferable for the metal oxide of the first intermediate layer to be $SiO_2$.

Alternatively, it is preferable for the metal oxide of the first intermediate layer to be $Ta_2O_5$.

In the ITO film-formed substrate according to the first aspect, it is preferable for the metal oxide of the second intermediate layer to be $SiO_x$.

Alternatively, it is preferable for the metal oxide of the second intermediate layer to be $Ta_2O_5$.

Alternatively, it is preferable for the metal nitride of the second intermediate layer to be $SiN_x$.

To attain the above object, an ITO film-formed substrate according to a second aspect of the present invention comprises a glass substrate, a color filter deposited on a surface of the glass substrate, an organic protective film deposited on a surface of the color filter, an intermediate layer deposited on a surface of the organic protective film, and an ITO film deposited on a surface of the intermediate layer, and is characterized in that the intermediate layer is deposited on the surface of the organic protective film through a high-frequency sputtering method using Ar as an introduced gas, and is made of a metal oxide that is not prone to dissolving in alkalis.

In the ITO film-formed substrate according to the second aspect, it is preferable for the metal oxide of the intermediate layer to be $SiO_2$.

Alternatively, it is preferable for the metal oxide of the intermediate layer to be $Ta_2O_5$.

To attain the above object, a method of manufacturing an ITO film-formed substrate according to the first aspect of the present invention comprises a color filter depositing step of depositing a color filter on a surface of a glass substrate, an organic protective film depositing step of depositing an organic protective film on a surface of the color filter, an intermediate layer depositing step of depositing an intermediate layer on a surface of the organic protective film, and an ITO film depositing step of depositing an ITO film on a surface of the intermediate layer, and is characterized in that the intermediate layer depositing step comprises a first intermediate layer depositing step of depositing, on the surface of the organic protective film through a high-frequency sputtering method using Ar as an introduced gas, a first intermediate layer made of a metal oxide that is not prone to dissolving in alkalis, and a second intermediate layer depositing step of depositing, on a surface of the first intermediate layer through another high-frequency sputtering method, a second intermediate layer made of a metal oxide or metal nitride that is not prone to dissolving in alkalis.

In the manufacturing method according to the first aspect, the high-frequency sputtering method is characterized by using $SiO_2$ as a target.

Alternatively, it is preferable to use $Ta_2O_5$ as a target in the high-frequency sputtering method.

In the manufacturing method according to the first aspect, it is preferable for the other high-frequency sputtering method to be a reactive sputtering method using Si as a target and $N_2$ as an introduced gas.

Alternatively, it is preferable for the other high-frequency sputtering method to be a reactive sputtering method using Si as a target and $O_2$ as an introduced gas.

Alternatively, it is preferable for the other high-frequency sputtering method to use $Ta_2O_5$ as a target and Ar as an introduced gas.

To attain the above object, a method of manufacturing an ITO film-formed substrate according to the second aspect of the present invention comprises a color filter depositing step of depositing a color filter on a surface of a glass substrate, an organic protective film depositing step of depositing an organic protective film on a surface of the color filter, an intermediate layer depositing step of depositing an intermediate layer on a surface of the organic protective film, and an ITO film depositing step of depositing an ITO film on a surface of the intermediate layer, and is characterized in that the intermediate layer depositing step comprises depositing, on the surface of the organic protective film through a high-frequency sputtering method using Ar as an introduced gas, an intermediate layer made of a metal oxide that is not prone to dissolving in alkalis.

In the manufacturing method according to the second aspect, it is preferable to use $SiO_2$ as a target in the high-frequency sputtering method.

Alternatively, it is preferable to use $Ta_2O_5$ as a target in the high-frequency sputtering method.

BRIEF DESCRIPTION OF THE DRAWINGS

FIG. 4A shows a case in which an intermediate layer 104 dissolves in an alkali in the vicinity of an interface between an ITO film 105 and the intermediate layer 104, FIG. 4B shows a case in which the intermediate layer 104 dissolves in an alkali in the vicinity of an interface between the intermediate layer 104 and the organic protective film 103, and FIG. 4C shows a case in which the organic protective film 103 dissolves in an alkali in the vicinity of the interface between the intermediate layer 104 and the organic protective film 103.

BEST MODE FOR CARRYING OUT THE INVENTION

Figure 1:
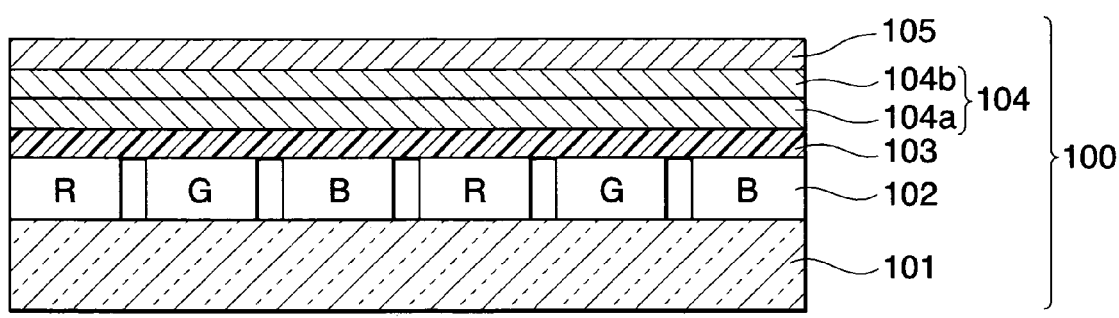
FIG. 1 is a sectional view of an ITO film-formed substrate according to an embodiment of the present invention.

The present inventors carried out assiduous studies to attain the above object, and as a result, for improving the alkali resistance and adhesion of an ITO film-formed substrate, turned their attention to the intermediate layer interposed between the ITO film and the organic protective film.

That is, the present inventors discovered that in the case of an ITO film-formed substrate comprised of a color filter deposited on a surface of a glass substrate, an organic protective film deposited on a surface of the color filter, an intermediate layer deposited on a surface of the organic protective film, and an ITO film deposited on a surface of the intermediate layer, if the intermediate layer is comprised of a first intermediate layer that is deposited on the surface of the organic protective film through a high-frequency sputtering method using Ar as an introduced gas, and is made of a metal oxide that is not prone to dissolving in alkalis, and a second intermediate layer that is deposited on a surface of the first intermediate layer, and is made of a metal oxide or metal nitride that is not prone to dissolving in alkalis, then because the first intermediate layer is deposited on the surface of the organic protective film through a high-frequency sputtering method using Ar, the surface of the organic protective film becomes C—C bonds, which have low polarity, and thus an organic protective film that is not prone to dissolving in alkalis can be deposited; moreover, the plasma generated during the deposition is an Ar plasma, for which decomposition of the organic protective film due to the plasma is not prone to occurring, and hence the amount of attrition of the organic protective film becomes low, and thus it is possible to prevent erosion by alkalis becoming prone to occur due to a component of the organic protective film such as carbon being taken into the first intermediate layer; furthermore, because the first intermediate layer is made of a metal oxide that is not prone to dissolving in alkalis, and the second intermediate layer is made of a metal oxide or metal nitride that is not prone to dissolving in alkalis, the intermediate layer obviously becomes not prone to being dissolved by alkalis, but moreover it becomes that alkalis are not prone to permeating through the intermediate layer, and thus erosion of the organic protective film by alkalis is prevented; as a result of the above, an ITO film-formed substrate having excellent alkali resistance and adhesion can be obtained.

Furthermore, the present inventors discovered that even if the intermediate layer having a two-layer structure is instead formed as a one-layer structure, an ITO film-formed substrate having relatively high alkali resistance and adhesion can be obtained.

Moreover, the present inventors discovered that in the case of a method of manufacturing an ITO film-formed substrate comprised of a color filter depositing step of depositing a color filter on a surface of a glass substrate, an organic protective film depositing step of depositing an organic protective film on a surface of the color filter, an intermediate layer depositing step of depositing an intermediate layer on a surface of the organic protective film, and an ITO film depositing step of depositing an ITO film on a surface of the intermediate layer, if the intermediate layer depositing step is comprised of a first intermediate layer depositing step of depositing, on the surface of the organic protective film through a high-frequency sputtering method using Ar as an introduced gas, a first intermediate layer made of a metal oxide that is not prone to dissolving in alkalis, and a second intermediate layer depositing step of depositing, on a surface of the first intermediate layer through another high-frequency sputtering method, a second intermediate layer made of a metal oxide or metal nitride that is not prone to dissolving in alkalis, then because the intermediate layer depositing step is comprised of a first intermediate layer depositing step of depositing, on the surface of the organic protective film through a high-frequency sputtering method using Ar as an introduced gas, a first intermediate layer made of a metal oxide that is not prone to dissolving in alkalis, and a second intermediate layer depositing step of depositing, on a surface of the first intermediate layer through another high-frequency sputtering method, a second intermediate layer made of a metal oxide or metal nitride that is not prone to dissolving in alkalis, an ITO film-formed substrate having excellent alkali resistance and adhesion can be manufactured.

Furthermore, the present inventors discovered that even in the case that the intermediate layer is not a two-layer structure but rather an intermediate layer is formed with a one-layer structure, an ITO film-formed substrate having relatively high alkali resistance can be manufactured.

The following is a description of the constitution of an ITO film-formed substrate according to an embodiment of the present invention, given with reference to the drawings.

FIG. 1 is a sectional view of an ITO film-formed substrate according to an embodiment of the present invention.

In FIG. 1, the ITO film-formed substrate 100 is comprised of a glass substrate 101, a color filter 102 comprised of pixels of three colors, red, green and blue, an organic protective film 103 that flattens undulations on the color filter 102 arising due to the pixels and also protects the surface of the color filter 102, an intermediate layer 104 comprised of intermediate layers 104a and 104b, and an ITO film 105 having an electrode pattern patterned therein through a method shown in FIGS. 3A to 3F described later; a structure is adopted in which the glass substrate 101, the color filter 102, the organic protective film 103, the intermediate layer 104 and the ITO film 105 are formed in this order from the bottom upwards.

Figure 2:
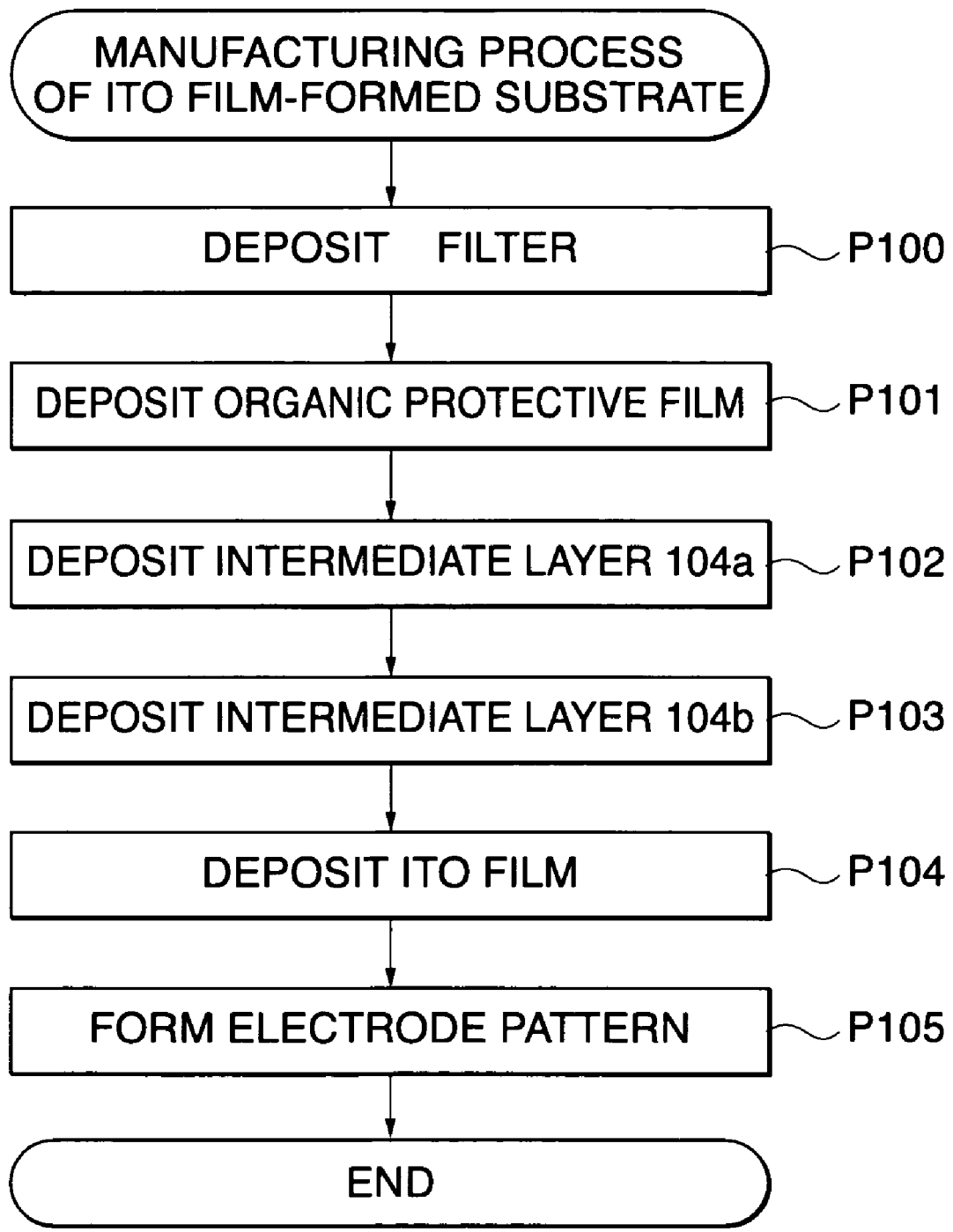
FIG. 2 is a flowchart of a manufacturing process of the ITO film-formed substrate 100 of FIG. 1.

FIG. 2 is a flowchart of a manufacturing process of the ITO film-formed substrate 100 of FIG. 1.

First, the color filter 102 is deposited on a surface of the glass substrate 101 (step P100), and then the organic protective film 103 is deposited on a surface of the color filter 102 (step P101).

After that, using a method described later, the intermediate layer 104, which has a two-layer structure, is formed, by first depositing the intermediate layer 104a on a surface of the organic protective film 103 (step P102), and then depositing the intermediate layer 104b on a surface of the intermediate layer 104a (step P103).

Finally, the ITO film 105 is deposited on a surface of the intermediate layer 104b (step P104), and an electrode pattern is patterned into the ITO film 105 as described below using FIGS. 3A to 3F (step P105), thus completing the process.

FIGS. 3A to 3F are views useful in explaining the method of patterning the electrode pattern into the ITO film 105 in step P105 of FIG. 2, being sectional views of the ITO film-formed substrate 100 in each step.

The electrode pattern of the ITO film 105 is formed through the following photolithography method.

Figure 3A:
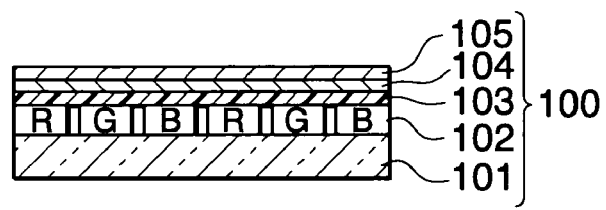
FIGS. 3A to 3F are views useful in explaining a method of patterning an electrode pattern in step P105 of FIG. 2, being sectional views of the ITO film-formed substrate 100 in each step.
Figure 3B:
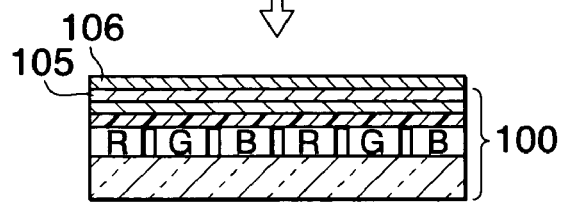
Figure 3C:
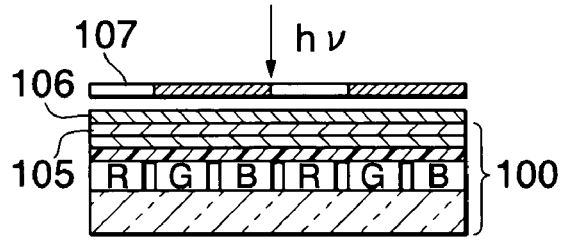
Figure 3D:
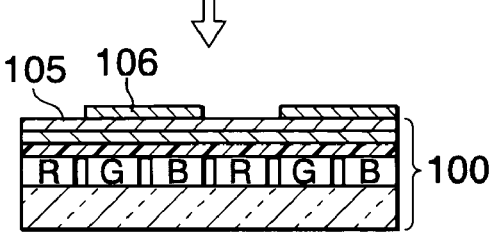

First, a resist 106 is applied (FIG. 3B) onto the ITO film 105 of the substrate 100 (FIG. 3A) of FIG. 1, the electrode pattern is masked onto the surface of the applied resist 106 using a mask 107, and exposure is carried out with light (hv) (FIG. 3C).

Figure 3E:
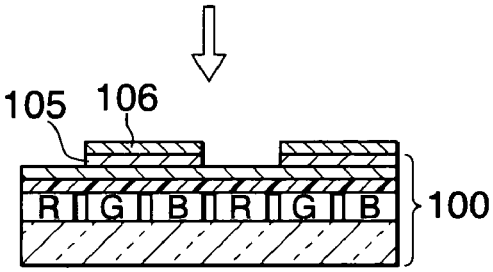

Next, the substrate 100 is immersed in a developing solution, thus stripping off the photosensitized parts of the resist 106 (FIG. 3D), and the electrode pattern that has been patterned into the resist 106 is patterned into the ITO film 105 using a strong acid (FIG. 3E).

Figure 3F:
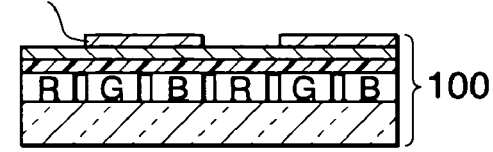

After that, the substrate 100 is immersed in a strongly alkaline solution, thus stripping off the resist 106 that was applied onto the surface of the ITO film 105 (resist stripping step) (FIG. 3F).

It is empirically known that when the substrate 100 is immersed in the alkaline solution during the resist stripping step, the alkali resistance of the substrate 100 drops, and the ITO film 105 is prone to peeling away from the substrate 100 (the adhesion drops).

Figure 4A:
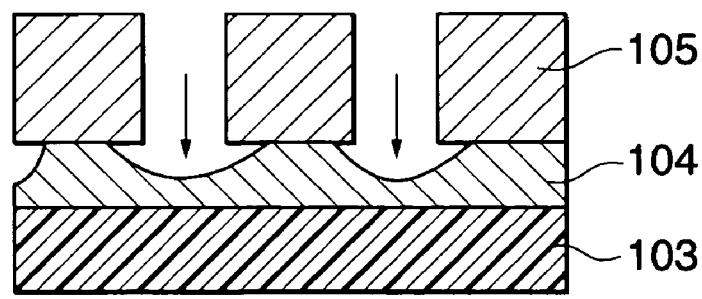
FIGS. 4A to 4C are views useful in explaining causes of dropping of the alkali resistance of the ITO film-formed substrate 100 of FIG. 1.
Figure 4B:
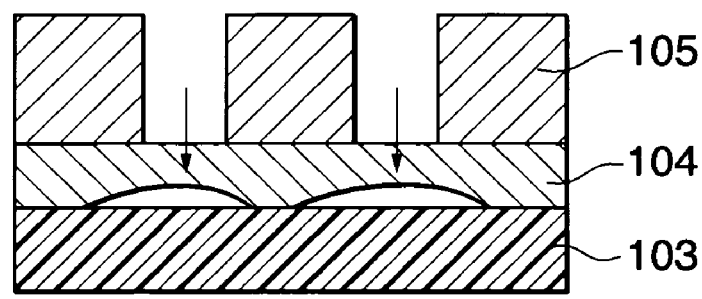
Figure 4C:
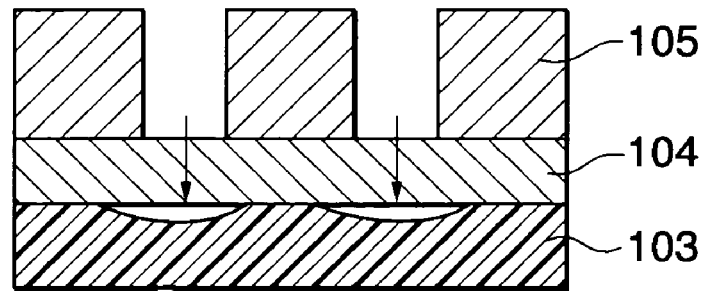

Causes of the alkali resistance of the substrate 100 dropping when the substrate 100 is immersed in the alkali are the intermediate layer 104 dissolving in the alkaline solution in the vicinity of the interface between the ITO film 105 and the intermediate layer 104 (FIG. 4A), the alkaline solution permeating into the intermediate layer 104 and the intermediate layer 104 dissolving in the vicinity of the interface between the intermediate layer 104 and the organic protective film 103 (FIG. 4B), the alkaline solution permeating into the intermediate layer 104 and the organic protective film 103 dissolving in the alkaline solution in the vicinity of the interface between the intermediate layer 104 and the organic protective film 103 (FIG. 4C), and a combination of these causes.

To prevent the occurrence of these causes of the alkali resistance of the substrate 100 dropping, it is preferable for the intermediate layers 104a and 104b formed between the ITO film 105 and the organic protective film 103 to be sputtered with the undermentioned deposition requirements. The following is a description of preferable deposition conditions for the intermediate layers 104a and 104b.

1) Deposition Conditions for the Intermediate Layer 104a

1)-1 At the surface of the organic protective film 103 there being bonds for which dissolving in alkaline solutions is not prone to occurring.

The solubility in alkaline solutions depends on the bonds at the surface of the organic protective film 103 after the deposition of the intermediate layer 104a; out of C—C bonds, C—N bonds and C—O bonds, dissolving in alkaline solutions is less prone to occur the lower the polarity, i.e. in the order of C—C bonds>C—N bonds>C—O bonds.

Giving an account of the bonds at the surface of the organic protective film 103, as a result of removing the intermediate layer 104a after deposition and then evaluating the surface of the organic protective film 103 using X-ray photoelectron spectroscopy (XPS), it was found that in the case that Ar is used as the introduced gas when carrying out the sputtering, because an Ar plasma is generated, C—C bonds become numerous at the surface of the organic protective film 103, in the case that $N_2$ is used as the introduced gas, because an $N_2$ plasma is generated, C—N bonds become numerous at the surface of the organic protective film 103, and in the case that $O_2$ is used as the introduced gas, because an $O_2$ plasma is generated, C—O bonds become numerous at the surface of the organic protective film 103. It is thus preferable to use Ar as the introduced gas when depositing the first intermediate layer.

1)-2 The amount of attrition of the organic protective film 103 during the deposition of the intermediate layer 104a being low.

When depositing the intermediate layer on the surface of the organic protective film 103, the organic protective film 103 is decomposed by the plasma. If the amount of attrition of the organic protective film 103 due to the decomposition becomes large, then a large amount of a component of the organic protective film 103 such as carbon is taken into the deposited intermediate layer 104a, and thus erosion by alkalis becomes prone to occurring. Out of Ar, $N_2$, and $O_2$ plasmas, the amount of attrition of the organic protective film 103 becomes large in the case that an $N_2$ or $O_2$ plasma is used, and becomes low in the case that an Ar plasma is used. It is thus preferable to use an Ar plasma when depositing the intermediate layer 104a.

1)-3 The intermediate layer 104a being made of a material that is not prone to dissolving in alkalis.

The intermediate layer 104a itself obviously becomes not prone to being dissolved by alkalis, but moreover it becomes that alkalis are not prone to permeating through the intermediate layer 104a, and hence erosion of the organic protective film 103 by alkalis can be prevented.

It is preferable to use a material having a property of being less prone to dissolve in alkalis than $SiN_x+SiO_x$ or $TiO_2$, which are generally used as intermediate layer materials. Specifically, it is preferable to use a material such as $SiO_2$ or $Ta_2O_5$.

1)-4 The film deposited on the substrate 100 as the intermediate layer 104a being a silicon oxide film.

The Si of a silicon oxide ($SiO_x$) film has a chemically similar nature to carbon, which is a principal constituent element of the organic protective film 103, and hence readily forms strong bonds to the organic protective film 103. Consequently, if a silicon oxide film is used as the intermediate layer 104a, then strong adhesion can be obtained.

1)-5 Other

In the case, for example, that a $Ta_2O_5$ film deposited through a high-frequency sputtering method using $Ta_2O_5$ as a target and Ar as an introduced gas is used as the intermediate layer 104a, the properties from 1)-1 to 1)-3 are satisfied, and hence a substrate 100 having relatively high alkali resistance and adhesion can be obtained.

2) Deposition Conditions for the Intermediate Layer 104b Deposited on the Intermediate Layer 104a 2)-1 The intermediate layer 104b being made of a material that is not prone to dissolving in alkalis.

The intermediate layer 104b itself obviously becomes not prone to being dissolved by alkalis, but moreover it becomes that alkalis are not prone to permeating through the intermediate layer 104b, and hence erosion of the intermediate layer 104a and/or the organic protective film 103 by alkalis can be prevented.

It is preferable to use a material having a property of being less prone to dissolve in alkalis than $SiN_x+SiO_x$ or $TiO_2$, which are generally used. Specifically, it is preferable to use a material such as $SiO_x$, $SiN_x$ or $Ta_2O_5$.

2)-2 A component of the film deposited on the substrate 100 as the intermediate layer 104b being chemically similar to the ITO film 105.

Considering the adhesion between the intermediate layer 104b and the ITO film 105, a material having a chemically similar nature is preferable. Moreover, because the intermediate layer 104b is deposited on the intermediate layer 104a, it is not necessary to consider the effects of the intermediate layer 104b on the organic protective film 103.

To satisfy the above conditions, in step P102 in FIG. 2, an intermediate layer 104a made of a metal oxide that is not prone to dissolving in alkalis such as $SiO_2$ or $Ta_2O_5$ is deposited on the surface of the organic protective film 103 through a high-frequency sputtering method using Ar as an introduced gas and $SiO_2$, $Ta_2O_5$ or the like as a target.

Moreover, in step P103 in FIG. 2, an intermediate layer 104b made of a metal oxide or metal nitride that is not prone to dissolving in alkalis such as $SiN_x$ or $SiO_x$ is deposited on the surface of the intermediate layer 104a through a reactive sputtering method using $N_2$ or $O_2$ as an introduced gas and Si as a target, or else an intermediate layer 104b made of a metal oxide that is not prone to dissolving in alkalis such as $Ta_2O_5$ is deposited on the surface of the intermediate layer 104a through a high-frequency sputtering method using Ar as an introduced gas and $Ta_2O_5$ or the like as a target.

Moreover, the intermediate layer 104 in the present embodiment was a two-layer structure, but in the case of having the properties described above, i.e. properties of it being possible to prevent the occurrence of causes of the alkali resistance and the adhesion dropping, the intermediate layer 104 may be a one-layer structure.

The following is a description of the ITO film-formed substrate according to a variation of the present embodiment in which the intermediate layer is a one-layer structure.

Figure 5:
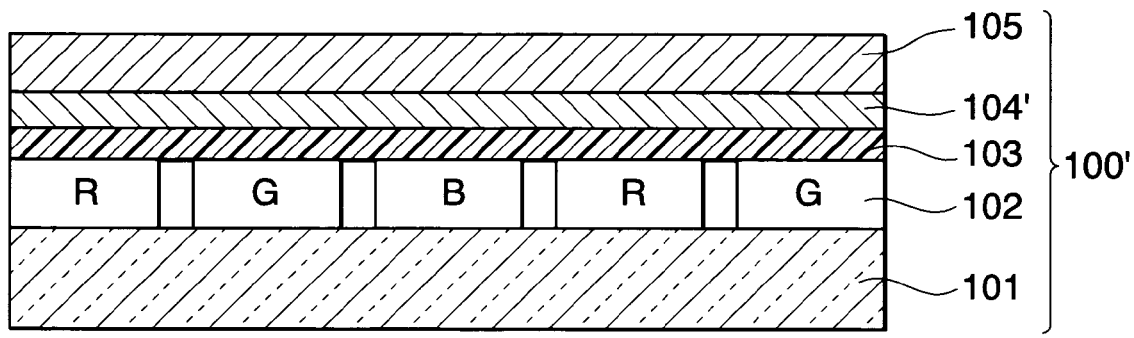
FIG. 5 is a sectional view of the ITO film-formed substrate 100' according to the present variation.

FIG. 5 is a sectional view of the ITO film-formed substrate 100 according to the present variation.

In FIG. 5, the ITO film-formed substrate 100' according to the present variation is comprised of a glass substrate 101, a color filter 102 comprised of pixels of the three colors, i.e. red, green and blue, an organic protective film 103 that flattens undulations on the color filter 102 arising due to the pixels and also protects the surface of the color filter 102, an intermediate layer 104', and an ITO film 105 having an electrode pattern patterned therein through the method of FIGS. 3A and 3B.

For the substrate 100', a structure is adopted in which the color filter 102, the organic protective film 103, the intermediate layer 104' and the ITO film 105 are formed in this order from the bottom upwards on a surface of the glass substrate 101.

A manufacturing process of the ITO film-formed substrate 100 of FIG. 5 is based on the manufacturing process of FIG. 2. However, steps P102 and P103 are replaced with a step of depositing, on a surface of the organic protective film 103 through a high-frequency sputtering method using Ar as an introduced gas, the intermediate layer 104', which is made of a metal oxide that is not prone to dissolving in alkalis.

As a result, even in the case that the intermediate layer is formed as a one-layer structure rather than a two-layer structure, an ITO film-formed substrate having relatively high alkali resistance and adhesion can be manufactured.

EXAMPLES

Next, a concrete description will be given of examples of the present invention.

As the substrates used as samples, ones in which a color filter 102 comprised of picture elements of the three colors of red, green and blue was formed on a glass substrate 101, and then an acrylic organic protective film 103 was coated onto the color filter 102 were used.

Each substrate was cleaned using an alkaline detergent in a dipping-type ultrasonic cleaning machine, and was then dried in a warm current of air. Next, each substrate was put into an in-line-type vacuum deposition apparatus, exhausting and heating were carried out to $1.3 \times 10^{-8}$ Pa and approximately 220° C., and then sputtering of a target was carried out using an inert gas (Ar) as the introduced gas, and/or sputtering of a compound of a target and a reactive gas was carried out using the reactive gas ($N_2$ or $O_2$) as the introduced gas, thus depositing an intermediate layer comprised of one or two layers on each substrate.

Next, an ITO film 105 was deposited to 150 nm using an ion plating method on the substrate on which the intermediate layer had been deposited, without exposing the substrate to the atmosphere.

After that, an electrode pattern was patterned into the ITO film 105 using a photolithography method such that the lines and spaces were 70 μm and 20 μm respectively, to prepare various samples as Examples 1 to 7 and Comparative Examples 1 to 6 shown in Table 1.

sition of the intermediate layer was 27 nm, and the bonds seen most at the surface of the organic protective film 103 were C—C bonds.

In Example 3, first, using $SiO_2$ as a target and Ar as an introduced gas and adjusting the pressure to 0.4 Pa, $SiO_2$ was deposited to 5 nm, and then, using $Ta_2O_5$ as a target and Ar as an introduced gas, $Ta_2O_5$ was deposited to 5 nm, thus producing an intermediate layer having a two-layer structure. Upon investigating the alkali resistance, abnormality of

TABLE 1

|  |  | Intermediate Layer 104 | | | | | | Bonds at Surface of |
|---|---|---|---|---|---|---|---|---|
|  |  | Intermediate Layer 104a | | Intermediate Layer 04b | | | Amount of | Alkali | Organic Protective |
|  |  | Target | Introduced Gas | Target | Introduced Gas | Intermediate Layer | Attrition | Resistance | Film |
| Examples | 1 | $SiO_2$ | Ar | — | — | $SiO_2$(10 nm) | 32 nm | 50 min | C—C |
|  | 2 | $Ta_2O_5$ | Ar | — | — | $Ta_2O_5$(10 nm) | 27 nm | 70 min | C—C |
|  | 3 | $SiO_2$ | Ar | $Ta_2O_5$ | Ar | $SiO_2$(5 nm)/$Ta_2O_5$(5 nm) | 30 nm | 70 min | C—C |
|  | 4 | $SiO_2$ | Ar | Si | $N_2$ | $SiO_2$(5 nm)/$SiN_x$(5 nm) | 33 nm | 100 min | C—C |
|  | 5 | $SiO_2$ | Ar | Si | $O_2$ | $SiO_2$(5 nm)/$SiO_x$(5 nm) | 32 nm | 50 min | C—C |
|  | 6 | $Ta_2O_5$ | Ar | Si | $N_2$ | $Ta_2O_5$(5 nm)/$SiN_x$(5 nm) | 28 nm | 100 min | C—C |
|  | 7 | $Ta_2O_5$ | Ar | Si | $O_2$ | $Ta_2O_5$(5 nm)/$SiO_x$(5 nm) | 34 nm | 60 min | C—C |
| Comparative | 1 | Si | $N_2$ | — | — | $SiN_x$(10 nm) | 53 nm | 10 min | C—N |
| Examples | 2 | Si | $O_2$ | — | — | $SiO_x$(10 nm) | 59 nm | 0 min | C—O |
|  | 3 | Ti | $O_2$ | — | — | $TiO_x$(10 nm) | 62 nm | 0 min | C—O |
|  | 4 | Si | $N_2$ | Si | $O_2$ | $SiN_x$(5 nm)/$SiO_x$(5 nm) | 48 nm | 10 min | C—N |
|  | 5 | Si | $O_2$ | Si | $N_2$ | $SiO_x$(5 nm)/$SiN_x$(5 nm) | 56 nm | 0 min | C—O |
|  | 6 | Si | $O_2$ | $Ta_2O_5$ | Ar | $SiO_x$(5 nm)/$Ta_2O_5$(5 nm) | 61 nm | 0 min | C—O |

Tests for evaluating various properties were carried out as follows on the samples prepared as described above.

1. Alkali Resistance

A 4 mass % KOH aqueous solution was held at 55° C., and then each sample was immersed in the solution, and taking a state in which slight peeling was seen at the pattern edge of the ITO film 105 as abnormality of the ITO film 105, the time taken until this abnormality occurred was measured. The evaluation of the peeling was carried out by observing using an optical microscope.

2. Amount of Attrition

The intermediate layer of each sample was removed, and the amount of attrition of the organic protective film 103 during the deposition of the intermediate layer was measured. The measurement was carried out using a stylus-type profile meter.

3. Bonding at Surface of Organic Protective Film 103

The intermediate layer 104a was removed after being deposited, and the state of bonding at the surface of the organic protective film 103 was investigated using X-ray photoelectron spectroscopy (XPS).

In Example 1, using $SiO_2$ as a target and Ar as an introduced gas and adjusting the pressure to 0.4 Pa, $SiO_2$ only was deposited to 10 nm as an intermediate layer. Upon investigating the alkali resistance, abnormality of the ITO film 105 occurred after 50 minutes. Moreover, the amount of attrition of the organic protective film 103 during the deposition of the intermediate layer was 32 nm, and the bonds seen most at the surface of the organic protective film 103 were C—C bonds.

In Example 2, using $Ta_2O_5$ as a target and Ar as an introduced gas and adjusting the pressure to 0.7 Pa, $Ta_2O_5$ only was deposited to 10 nm as an intermediate layer. Upon investigating the alkali resistance, abnormality of the ITO film 105 occurred after 70 minutes. Moreover, the amount of attrition of the organic protective film 103 during the depothe ITO film 105 occurred after 70 minutes. Moreover, the amount of attrition of the organic protective film 103 during the deposition of the intermediate layer was 30 nm, and the bonds seen most at the surface of the organic protective film 103 were C—C bonds.

In Example 4, first, using $SiO_2$ as a target and Ar as an introduced gas and adjusting the pressure to 0.4 Pa, $SiO_2$ was deposited to 5 nm, and then, using Si as a target and $N_2$ as an introduced gas, $SiN_x$ was deposited to 5 nm, thus producing an intermediate layer having a two-layer structure. Upon investigating the alkali resistance, abnormality of the ITO film 105 occurred after 100 minutes. Moreover, the amount of attrition of the organic protective film 103 during the deposition of the intermediate layer was 33 nm, and the bonds seen most at the surface of the organic protective film 103 were C—C bonds.

In Example 5, first, using $SiO_2$ as a target and Ar as an introduced gas and adjusting the pressure to 0.4 Pa, $SiO_2$ was deposited to 5 nm, and then, using Si as a target and $O_2$ as an introduced gas, $SiO_x$ was deposited to 5 nm, thus producing an intermediate layer having a two-layer structure. Upon investigating the alkali resistance, abnormality of the ITO film 105 occurred after 50 minutes. Moreover, the amount of attrition of the organic protective film 103 during the deposition of the intermediate layer was 32 nm, and the bonds seen most at the surface of the organic protective film 103 were C—C bonds.

In Example 6, first, using $Ta_2O_5$ as a target and Ar as an introduced gas and adjusting the pressure to 0.7 Pa, $Ta_2O_5$ was deposited to 5 nm, and then, using Si as a target and $N_2$ as an introduced gas, $SiN_x$ was deposited to 5 nm, thus producing an intermediate layer having a two-layer structure. Upon investigating the alkali resistance, abnormality of the ITO film 105 occurred after 100 minutes. Moreover, the amount of attrition of the organic protective film 103 during the deposition of the intermediate layer was 28 nm, and the bonds seen most at the surface of the organic protective film 103 were C—C bonds.

In Example 7, first, using $Ta_2O_5$ as a target and Ar as an introduced gas and adjusting the pressure to 0.7 Pa, $Ta_2O_5$ was deposited to 5 nm, and then, using Si as a target and $O_2$ as an introduced gas, $SiO_x$ was deposited to 5 nm, thus producing an intermediate layer having a two-layer structure. Upon investigating the alkali resistance, abnormality of the ITO film 105 occurred after 60 minutes. Moreover, the amount of attrition of the organic protective film 103 during the deposition of the intermediate layer was 34 nm, and the bonds seen most at the surface of the organic protective film 103 were C—C bonds.

In Comparative Example 1, using Si as a target and $N_2$ as an introduced gas and adjusting the pressure to 0.5 Pa, $SiN_x$ only was deposited to 10 nm as an intermediate layer. Upon investigating the alkali resistance, abnormality of the ITO film 105 occurred after 10 minutes. Moreover, the amount of attrition of the organic protective film 103 during the deposition of the intermediate layer was 53 nm, and the bonds seen most at the surface of the organic protective film 103 were C—N bonds.

In Comparative Example 2, using Si as a target and $O_2$ as an introduced gas and adjusting the pressure to 0.5 Pa, $SiO_x$ only was deposited to 10 nm as an intermediate layer. Without getting as far as investigating the alkali resistance, abnormality of the ITO film 105 occurred during the resist stripping step (FIG. 3F). Moreover, the amount of attrition of the organic protective film 103 during the deposition of the intermediate layer was 59 nm, and the bonds seen most at the surface of the organic protective film 103 were C—O bonds.

In Comparative Example 3, using Ti as a target and $O_2$ as an introduced gas and adjusting the pressure to 0.5 Pa, $TiO_x$ only was deposited to 10 nm as an intermediate layer. Without getting as far as investigating the alkali resistance, abnormality of the ITO film 105 occurred during the resist stripping step (FIG. 3F). Moreover, the amount of attrition of the organic protective film 103 during the deposition of the intermediate layer was 62 nm, and the bonds seen most at the surface of the organic protective film 103 were C—O bonds.

In Comparative Example 4, first, using Si as a target and $N_2$ as an introduced gas and adjusting the pressure to 0.5 Pa, $SiN_x$ was deposited to 5 nm, and then, using Si as a target and $O_2$ as an introduced gas, $SiO_x$ was deposited to 5 nm, thus producing an intermediate layer having a two-layer structure. Upon investigating the alkali resistance, abnormality of the ITO film 105 occurred after 10 minutes. Moreover, the amount of attrition of the organic protective film 103 during the deposition of the intermediate layer was 48 nm, and the bonds seen most at the surface of the organic protective film 103 were C—N bonds.

In Comparative Example 5, first, using Si as a target and $O_2$ as an introduced gas and adjusting the pressure to 0.5 Pa, $SiO_x$ was deposited to 5 nm, and then, using Si as a target and $N_2$ as an introduced gas, $SiN_x$ was deposited to 5 nm, thus producing an intermediate layer having a two-layer structure. Without getting as far as investigating the alkali resistance, abnormality of the ITO film 105 occurred during the resist stripping step (FIG. 3F). Moreover, the amount of attrition of the organic protective film 103 during the deposition of the intermediate layer was 56 nm, and the bonds seen most at the surface of the organic protective film 103 were C—O bonds.

In Comparative Example 6, first, using Si as a target and $O_2$ as an introduced gas and adjusting the pressure to 0.5 Pa, $SiO_x$ was deposited to 5 nm, and then, using $Ta_2O_5$ as a target and Ar as an introduced gas, $Ta_2O_5$ was deposited to 5 nm, thus producing an intermediate layer having a two-layer structure. Without getting as far as investigating the alkali resistance, abnormality of the ITO film 105 occurred during the resist stripping step (FIG. 3F). Moreover, the amount of attrition of the organic protective film 103 during the deposition of the intermediate layer was 61 nm, and the bonds seen most at the surface of the organic protective film 103 were C—O bonds.

From the results for Comparative Examples 1 to 6 described above, it was shown that in the case that the amount of attrition of the organic protective film 103 during the deposition of the intermediate layer is large, and there are C—N bonds or C—O bonds at the surface of the organic protective film 103, the alkali resistance is low, and it becomes that peeling off of the ITO film 105 occurs readily.

The results for Examples 1 to 7 and Comparative Examples 1 to 6 described above are shown in Table 1.

From the results for Examples 1 to 7 described above, it can be learned that in the case of producing an intermediate layer having a two-layer structure, if the bonds at the surface of the organic protective film 103 are made to be C—C bonds and moreover the amount of attrition of the organic protective film 103 during the deposition of the intermediate layer is made to be low, this being by carrying out the sputtering of the first intermediate layer (the intermediate layer 104a) using Ar as the introduced gas, then the alkali resistance can be improved, and peeling off of the ITO film 105 can be prevented. In particular, in the case that a metal oxide or metal nitride having high alkali resistance was deposited as the second intermediate layer (the intermediate layer 104b), extremely good alkali resistance could be obtained. Moreover, from the results for Example 1 and Example 2, even in the case that the intermediate layer is only a single layer, there are bonds such as C—C bonds for which dissolving in alkalis is not prone to occurring at the surface of the organic protective film 103, and the amount of attrition of the organic protective film 103 during the deposition of the intermediate layer is low, and if the intermediate layer is made of a material that is not prone to dissolving in alkalis, an ITO film-formed substrate having relatively high alkali resistance and adhesion could be obtained.

INDUSTRIAL APPLICABILITY

As described in detail above, according to the ITO film-formed substrate and the manufacturing method thereof according to the first aspect of the present invention, the first intermediate layer is deposited on a surface of the organic protective film through a high-frequency sputtering method using Ar, and hence the surface of the organic protective film becomes C—C bonds, which have low polarity, and thus an organic protective film that is not prone to dissolving in alkalis can be deposited; moreover, the plasma generated during the deposition is an Ar plasma, for which decomposition of the organic protective film due to the plasma is not prone to occurring, and hence the amount of attrition of the organic protective film becomes low, and thus it is possible to prevent erosion by alkalis becoming prone to occur due to a component of the organic protective film such as carbon being taken into the first intermediate layer; furthermore, the first intermediate layer is made of a metal oxide that is not prone to dissolving in alkalis, and the second intermediate layer is made of a metal oxide or metal nitride that is not prone to dissolving in alkalis, and hence the intermediate layer obviously becomes not prone to being dissolved by alkalis, but moreover it becomes that alkalis are not prone to permeating through the intermediate layer, and thus erosion of the organic protective film by alkalis is prevented; as a result of the above, an ITO film-formed substrate having excellent alkali resistance and adhesion can be obtained.

In the ITO film-formed substrate and the manufacturing method thereof according to the first aspect, if $SiO_2$ is used as the metal oxide of the first intermediate layer, then the first intermediate layer can reliably be made to be not prone to dissolving in alkalis. Moreover, because Si, which is a constituent element of the first intermediate layer, and carbon, which is a principal constituent element of the organic protective film, have a chemically similar nature, strong bonds are readily formed, and as a result the adhesion between the first intermediate layer and the organic protective film can be improved.

In the ITO film-formed substrate and the manufacturing method thereof according to the first aspect, if $Ta_2O_5$ is used as the metal oxide of the first intermediate layer, then the first intermediate layer can reliably be made to be not prone to dissolving in alkalis.

In the ITO film-formed substrate and the manufacturing method thereof according to the first aspect, if $SiO_x$ is used as the metal oxide of the second intermediate layer, then the second intermediate layer can reliably be made to be not prone to dissolving in alkalis.

In the ITO film-formed substrate and the manufacturing method thereof according to the first aspect, if $Ta_2O_5$ is used as the metal oxide of the second intermediate layer, then the second intermediate layer can reliably be made to be not prone to dissolving in alkalis.

In the ITO film-formed substrate and the manufacturing method thereof according to the first aspect, if $SiN_x$ is used as the metal nitride of the second intermediate layer, then the second intermediate layer can reliably be made to be not prone to dissolving in alkalis.

According to the ITO film-formed substrate and the manufacturing method thereof according to the second aspect of the present invention, the intermediate layer is deposited on a surface of the organic protective film through a high-frequency sputtering method using Ar, and hence the surface of the organic protective film becomes C—C bonds, which have low polarity, and thus an organic protective film that is not prone to dissolving in alkalis can be deposited; moreover, the plasma generated during the deposition is an Ar plasma, for which decomposition of the organic protective film due to the plasma is not prone to occurring, and hence the amount of attrition of the organic protective film becomes low, and thus it is possible to prevent erosion by alkalis becoming prone to occur due to a component of the organic protective film such as carbon being taken into the intermediate layer; furthermore, the intermediate layer is made of a metal oxide that is not prone to dissolving in alkalis, and hence the intermediate layer obviously becomes not prone to being dissolved by alkalis, but moreover it becomes that alkalis are not prone to permeating through the intermediate layer, and thus erosion of the organic protective film by alkalis is prevented; as a result of the above, even in the case that the intermediate layer is not a two-layer structure but rather an intermediate layer having a one-layer structure is formed, an ITO film-formed substrate having relatively high alkali resistance and adhesion can be obtained.

In the ITO film-formed substrate and the manufacturing method thereof according to the second aspect, if $SiO_2$ is used as the metal oxide of the intermediate layer, then the intermediate layer can reliably be made to be not prone to dissolving in alkalis. Moreover, because Si, which is a constituent element of the intermediate layer, and carbon, which is a principal constituent element of the organic protective film, have a chemically similar nature, strong bonds are readily formed, and as a result the adhesion between the intermediate layer and the organic protective film can be improved.

In the ITO film-formed substrate and the manufacturing method thereof according to the second aspect, if $Ta_2O_5$ is used as the metal oxide of the intermediate layer, then the intermediate layer can reliably be made to be not prone to dissolving in alkalis.

What is claimed is:

1. An ITO film-formed substrate comprising a glass substrate, a color filter deposited on a surface of said glass substrate, an organic protective film deposited on a surface of said color filter, an intermediate layer deposited on a surface of said organic protective film, and an ITO film deposited on a surface of said intermediate layer, wherein:
    said intermediate layer comprises:
    a first intermediate layer that is deposited on the surface of said organic protective film through a high-frequency sputtering method using Ar as an introduced gas, and is made of a metal oxide that is not prone to dissolving in alkalis;
    a second intermediate layer that is deposited on a surface of said first intermediate layer, and is made of a metal oxide or metal nitride that is not prone to dissolving in alkalis; and
    the surface of said organic protective film has C—C bonds.

2. An ITO film-formed substrate as claimed in claim 1, characterized in that the metal oxide of said first intermediate layer is $SiO_2$.

3. An ITO film-formed substrate as claimed in claim 1, characterized in that the metal oxide of said first intermediate layer is $Ta_2O_5$.

4. An ITO film-formed substrate as claimed in any one of claims 1 through 3, wherein the second intermediate layer is made of a metal oxide and the metal oxide of said second intermediate layer is $SiO_x$.

5. An ITO film-formed substrate as claimed in any one of claims 1 through 3, wherein the second intermediate layer is made of a metal oxide and the metal oxide of said second intermediate layer is $Ta_2O_5$.

6. An ITO film-formed substrate as claimed in any one of claims 1 through 3, wherein the second intermediate layer is made of a metal nitride and the metal nitride of said second intermediate layer is $SiN_x$.

7. An ITO film-formed substrate comprising a glass substrate, a color filter deposited on a surface of said glass substrate, an organic protective film deposited on a surface of said color filter, an intermediate layer deposited on a surface of said organic protective film, and an ITO film deposited on a surface of said intermediate layer, wherein:
    said intermediate layer is deposited on the surface of said organic protective film through a high-frequency sputtering method using Ar as an introduced gas, and is made of a metal oxide that is not prone to dissolving in alkalis; and
    the surface of said organic protective film has C—C bonds.

8. An ITO film-formed substrate as claimed in claim 7, characterized in that the metal oxide of said intermediate layer is $SiO_2$.

9. An ITO film-formed substrate as claimed in claim 7, characterized in that the metal oxide of said intermediate layer is $Ta_2O_5$.

10. A method of manufacturing an ITO film-formed substrate comprising:
- a color filter depositing step of depositing a color filter on a surface of a glass substrate,
- an organic protective film depositing step of depositing an organic protective film on a surface of the color filter,
- an intermediate layer depositing step of depositing an intermediate layer on a surface of the organic protective film, and
- an ITO film depositing step of depositing an ITO film on a surface of the intermediate layer, wherein:
- said intermediate layer depositing step comprises:
- a first intermediate layer depositing step of depositing, on the surface of the organic protective film through a high-frequency sputtering method using Ar as an introduced gas, a first intermediate layer made of a metal oxide that is not prone to dissolving in alkalis;
- a second intermediate layer depositing step of depositing, on a surface of the first intermediate layer through another high-frequency sputtering method, a second intermediate layer made of a metal oxide or metal nitride that is not prone to dissolving in alkalis; and
- the surface of said organic protective film has C—C bonds.

11. A manufacturing method as claimed in claim 10, characterized in that $SiO_2$ is used as a target in the high-frequency sputtering method.

12. A manufacturing method as claimed in claim 10, characterized in that $Ta_2O_5$ is used as a target in the high-frequency sputtering method.

13. A manufacturing method as claimed in any one of claims 10 through 12, characterized in that the other high-frequency sputtering method is a reactive sputtering method using Si as a target and $N_2$ as an introduced gas.

14. A manufacturing method as claimed in any one of claims 10 through 12, characterized in that the other high-frequency sputtering method is a reactive sputtering method using Si as a target and $O_2$ as an introduced gas.

15. A manufacturing method as claimed in any one of claims 10 through 12, characterized in that the other high-frequency sputtering method uses $Ta_2O_5$ as a target and Ar as an introduced gas.

16. A method of manufacturing an ITO film-formed substrate comprising
- a color filter depositing step of depositing a color filter on a surface of a glass substrate,
- an organic protective film depositing step of depositing an organic protective film on a surface of the color filter,
- an intermediate layer depositing step of depositing an intermediate layer on a surface of the organic protective film, and
- an ITO film depositing step of depositing an ITO film on a surface of the intermediate layer, wherein:
- said intermediate layer depositing step comprises depositing, on the surface of the organic protective film through a high-frequency sputtering method using Ar as an introduced gas, an intermediate layer made of a metal oxide that is not prone to dissolving in alkalis; and
- the surface of said organic protective film has C—C bonds.

17. A manufacturing method as claimed in claim 16, characterized in that $SiO_2$ is used as a target in the high-frequency sputtering method.

18. A manufacturing method as claimed in claim 16, characterized in that $Ta_2O_5$ is used as a target in the high-frequency sputtering method.

* * * * *